United States Patent
Frantz et al.

(10) Patent No.: US 12,160,418 B1
(45) Date of Patent: *Dec. 3, 2024

(54) DIRECTLY ACCESSING AND ORGANIZING DATA SETS FROM A DATA WAREHOUSE

(71) Applicant: SIGMA COMPUTING, INC., San Francisco, CA (US)

(72) Inventors: Jason D. Frantz, San Francisco, CA (US); Robert C. Woollen, San Rafael, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,806

(22) Filed: Mar. 23, 2023

Related U.S. Application Data (63) Continuation of application No. 16/913,345, filed on Jun. 26, 2020, now Pat. No. 11,695,753.

(60) Provisional application No. 62/874,164, filed on Jul. 15, 2019.

(51) Int. Cl.
*H04L 9/40* (2022.01)
*G06F 16/26* (2019.01)
*G06F 16/28* (2019.01)
*G06F 21/62* (2013.01)
*G06F 40/18* (2020.01)

(52) U.S. Cl.
CPC ............ *H04L 63/083* (2013.01); *G06F 16/26* (2019.01); *G06F 16/283* (2019.01); *G06F 21/6218* (2013.01); *G06F 40/18* (2020.01); *H04L 63/102* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 6,684,207 B1 * | 1/2004 | Greenfield | G06F 16/2452 |
| 6,934,687 B1 * | 8/2005 | Papierniak | G06Q 30/0201 |
| | | | 705/7.41 |
| 7,003,560 B1 * | 2/2006 | Mullen | G06Q 10/06 |
| | | | 709/224 |
| 2005/0267868 A1 * | 12/2005 | Liebl | G06F 40/18 |
| 2018/0218051 A1 * | 8/2018 | Berger | G06F 16/951 |
| 2019/0095320 A1 * | 3/2019 | Biswas | G06F 11/3457 |

* cited by examiner

Primary Examiner — Brandon Hoffman (57) ABSTRACT

Directly accessing and organizing data sets from a data warehouse including receiving, by a data analyzer, a request from a service provider client instructing the data analyzer to retrieve a data set from a service provider data warehouse, wherein the service provider client is a client of a service provider, wherein the service provider data warehouse stores data sets for the service provider, and wherein the service provider client accesses the data analyzer and the service provider data warehouse without providing credentials; retrieving, by the data analyzer, the data set directly from the service provider data warehouse using credentials provided by the service provider; organizing, by the data analyzer, the data set into a worksheet; and presenting, by the data analyzer to the service provider client, the worksheet comprising the data set.

20 Claims, 7 Drawing Sheets

DIRECTLY ACCESSING AND ORGANIZING DATA SETS FROM A DATA WAREHOUSE

BACKGROUND

Field of the Invention

The field of the invention is data processing, or, more specifically, methods, apparatus, and products for directly accessing and organizing data sets from a data warehouse.

Description of Related Art

Many large and small companies utilize software-as-a-service (SaaS) providers for various facets of their businesses, including customer relationship management, payment processing, and document management. Each SaaS provider may, in turn, utilize cloud-based data warehouses to store all the raw data for each client of the service. A SaaS client that would like access to the raw data may request the data from the SaaS provider, but the received data may be stale and costly to retrieve regularly. Alternatively, giving the client access to the provider's data warehouse may raise security issues as well as problems properly organizing the raw data.

SUMMARY

Methods, systems, and apparatus for directly accessing and organizing data sets from a data warehouse. Directly accessing and organizing data sets from a data warehouse includes receiving, by a data analyzer, a request from a service provider client instructing the data analyzer to retrieve a data set from a service provider data warehouse, wherein the service provider client is a client of a service provider, wherein the service provider data warehouse stores data sets for the service provider, and wherein the service provider client accesses the data analyzer and the service provider data warehouse without providing credentials; retrieving, by the data analyzer, the data set directly from the service provider data warehouse using credentials provided by the service provider; organizing, by the data analyzer, the data set into a worksheet; and presenting, by the data analyzer to the service provider client, the worksheet comprising the data set.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
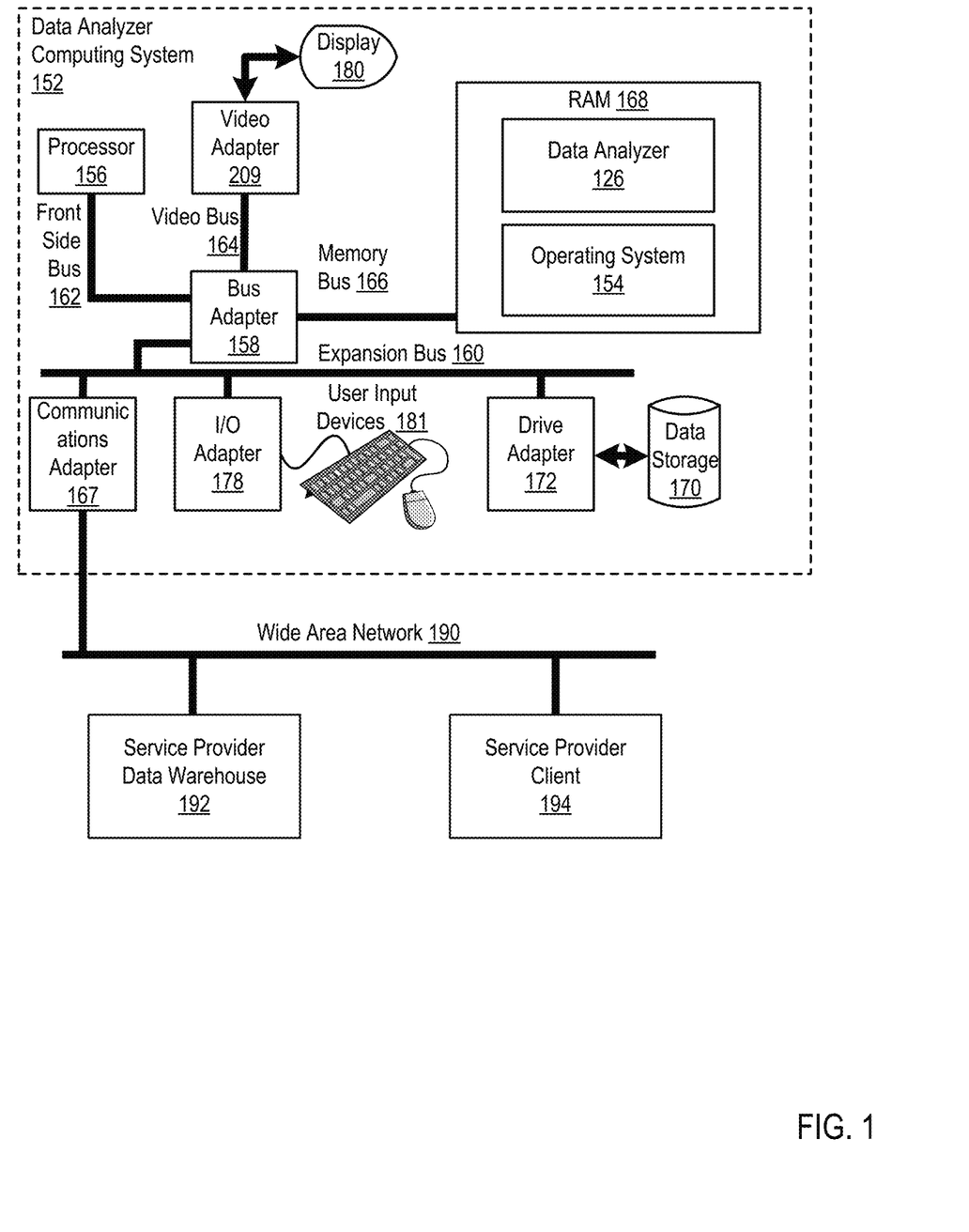
FIG. 1 sets forth a block diagram of an example system configured for directly accessing and organizing data sets from a data warehouse according to embodiments of the present invention.

Exemplary methods, apparatus, and products for directly accessing and organizing data sets from a data warehouse in accordance with the present invention are described with reference to the accompanying drawings, beginning with FIG. 1. FIG. 1 sets forth a block diagram of automated computing machinery comprising an exemplary data analyzer computing system (152) configured for directly accessing and organizing data sets from a data warehouse according to embodiments of the present invention. The data analyzer computing system (152) of FIG. 1 includes at least one computer processor (156) or 'CPU' as well as random access memory (168) ('RAM') which is connected through a high speed memory bus (166) and bus adapter (158) to processor (156) and to other components of the data analyzer computing system (152).

Stored in RAM (168) is an operating system (154). Operating systems useful in computers configured for directly accessing and organizing data sets from a data warehouse according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the data analyzer (126), a module for directly accessing and organizing data sets from a data warehouse according to embodiments of the present invention.

The data analyzer computing system (152) of FIG. 1 includes disk drive adapter (172) coupled through expansion bus (160) and bus adapter (158) to processor (156) and other components of the data analyzer computing system (152). Disk drive adapter (172) connects non-volatile data storage to the data analyzer computing system (152) in the form of data storage (170). Disk drive adapters useful in computers configured for directly accessing and organizing data sets from a data warehouse according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data analyzer computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data analyzer computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data analyzer computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for directly accessing and organizing data sets from a data warehouse according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a service provider data warehouse (192) and a service provider client (194). The service provider data warehouse (192) is a computing system or group of computing systems that hosts a database for access over the wide area network (190). The service provider client (194) is a computing system that accesses the service provider data warehouse (192) using the data analyzer (126) on the data analyzer computing system (152).

Figure 2:
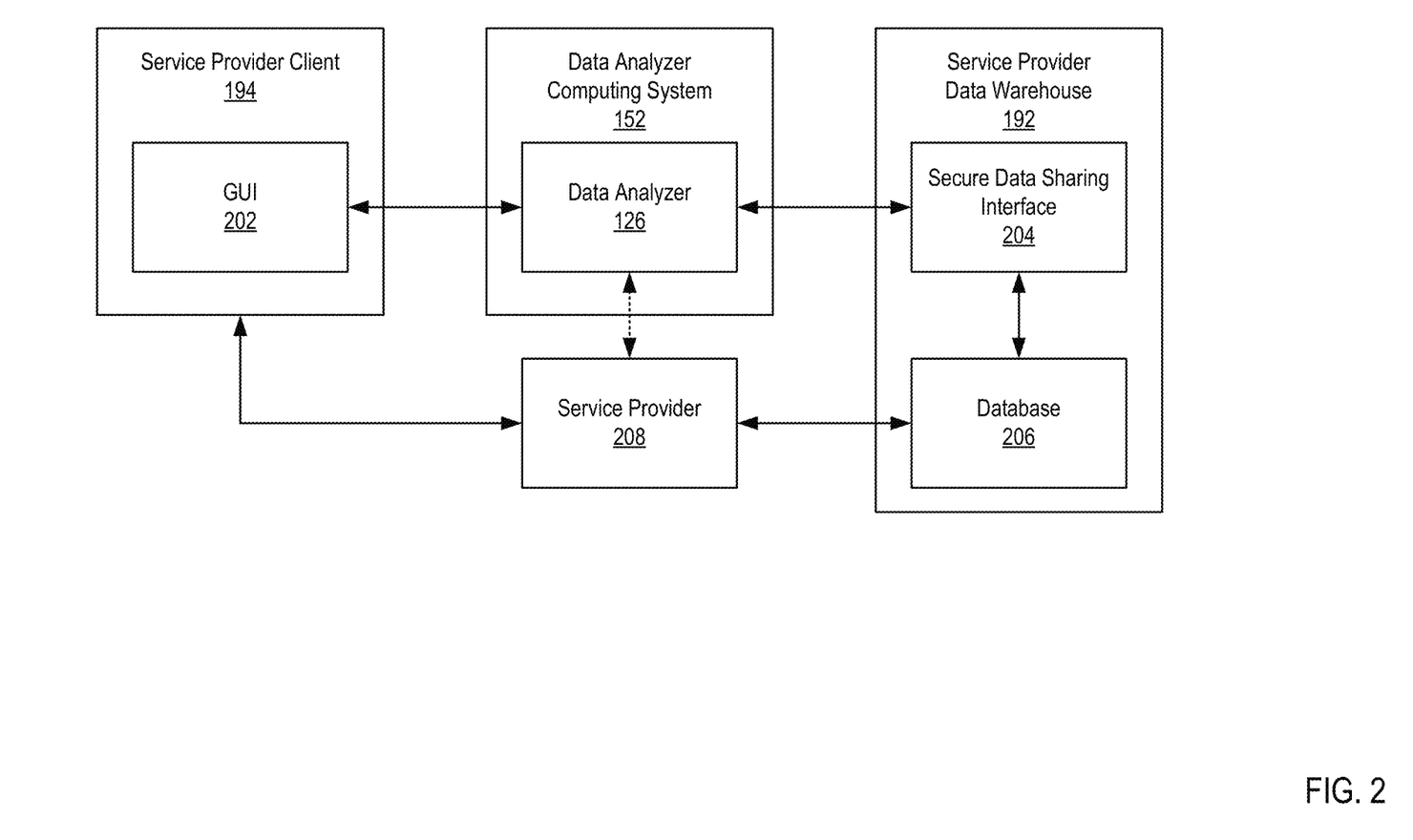
FIG. 2 sets forth a block diagram of an example system configured for directly accessing and organizing data sets from a data warehouse according to embodiments of the present invention.

FIG. 2 shows an exemplary system for directly accessing and organizing data sets from a data warehouse according to embodiments of the present invention. As shown in FIG. 2, the exemplary system includes a service provider client (194), a data analyzer computing system (152), a service provider data warehouse (192), and a service provider (208). The service provider client (194) includes a graphical user interface (GUI) (202), the data analyzer computing system (152) includes a data analyzer (126), and the service provider data warehouse (192) includes a secure data sharing interface (204) and a database (206).

The service provider (208) is a computing system or collection of computing systems that provides a service to the service provider client (194) by collecting data from the service provider client and providing data to the service provider client. The service provider (208) may be a software as a service (SaaS) provider providing a service such as, for example, a customer relationship management, payment processing, or document management. The service provider (208) stores data to, and retrieves data from, the database (206) on the service provider data warehouse (192).

The service provider data warehouse (192) is a computing system or collection of computing systems under the control of the service provider (208) that stores one or more databases (206). The database (206) is a collection of data and a management system for the data. A data set is a collection of data from the database (206). Data sets may be organizations of data generated in response to a database query and provided to the service provider (208) or data analyzer (126). Data sets may be organized into columns and rows. The particular columns, rows, and organization of the columns and rows that make up a data set may be specified in the database query requesting the data set. A data set, as sent from the database (206) to the service provider (208) or data analyzer (126), may be a portion or subset of a source database table on the database (206).

The service provider client (194) is a computing system under the control of a client of the service provider (208) and with an authorized and authenticated service provider account. The service provider (208) may generally use the database (206) on the service provider data warehouse (192) to store data for the service provider clients (e.g., service provider client (194)). For example, a service provider client that is a food truck business may utilize a payment processing SaaS provider. The payment processor may generate data for each payment processed by the food truck and store that data in a database (206) on the payment processor's data warehouse (192).

The service provider client (194) may lack direct access to the service provider data warehouse (192) (without using a secure data sharing interface (204)). Specifically, the service provider client (194) may not have credentials to access the service provider data warehouse (192). The service provider (208) may provide an application programming interface (API) (such as a representational state transfer API) to retrieve data from the database (206). Such an API may rely on the service provider to mediate requests between the service provider client (194) and the database (206) on the service provider data warehouse (192). Continuing with the example above, the food truck owner may want to view or manipulate her payment processing data in ways that the payment processor SaaS provider does not support (e.g., combining the payment processing data with customer relationship management data). The payment processor SaaS provider may provide an API to retrieve data from the database (206). However, because the data is copied via the service provider, the data may be stale. Further, keeping the copied data current may require constant updating via the service provider, increasing traffic to the service provider and increasing client resources necessary to retrieve the data. Instead, the service provider (208) may create or enable a secure data sharing interface (204) from which the service provider client may access the database (206).

The secure data sharing interface (204) is an interface that provides service provider clients (e.g., service provider client (194)) with direct access to the database (206) on the service provider data warehouse (192), bypassing the service provider (208). The secure data sharing interface (204) may limit access to the database (206) based on the service provider client (194). The service provider (208) may provide the service provider client (194) (or data analyzer (126) utilized by the service provider client (194)) with special credentials to access a portion of the database (206) via the secure data sharing interface (204). The service provider client (194) may be allowed to access only the data sets on the database (206) associated with the service provider client (194). Although the data set may be accessible via the secure data sharing interface (204), the data sets themselves may not be in a form that is usable by most service provider clients.

The data analyzer (126) is hardware, software, or an aggregation of hardware and software configured to receive requests from the service provider client (194), via the GUI (202). The data analyzer (126) is also configured to generate queries in response to requests for data sets and manipulations of those data sets. The data analyzer (126) may be part of a query generator that generates queries targeting the secure data sharing interface (204) on the service provider data warehouse (192). The data analyzer (126) may also select a worksheet template for incoming data sets and organize the data sets into a worksheet based on the worksheet template.

The GUI (202) is a visual presentation configured to present data sets in the form of worksheets and graphical elements to a user. The GUI (202) also receives requests from a user for data sets from the database (206). The GUI (202) may be presented, in part, by the data analyzer (126) and displayed on a service provider client (194) (e.g., on a system display or mobile touchscreen). The GUI (202) may be part of an Internet application that includes the data analyzer (126) and is hosted on the data analyzer computing system (152).

Figure 3:
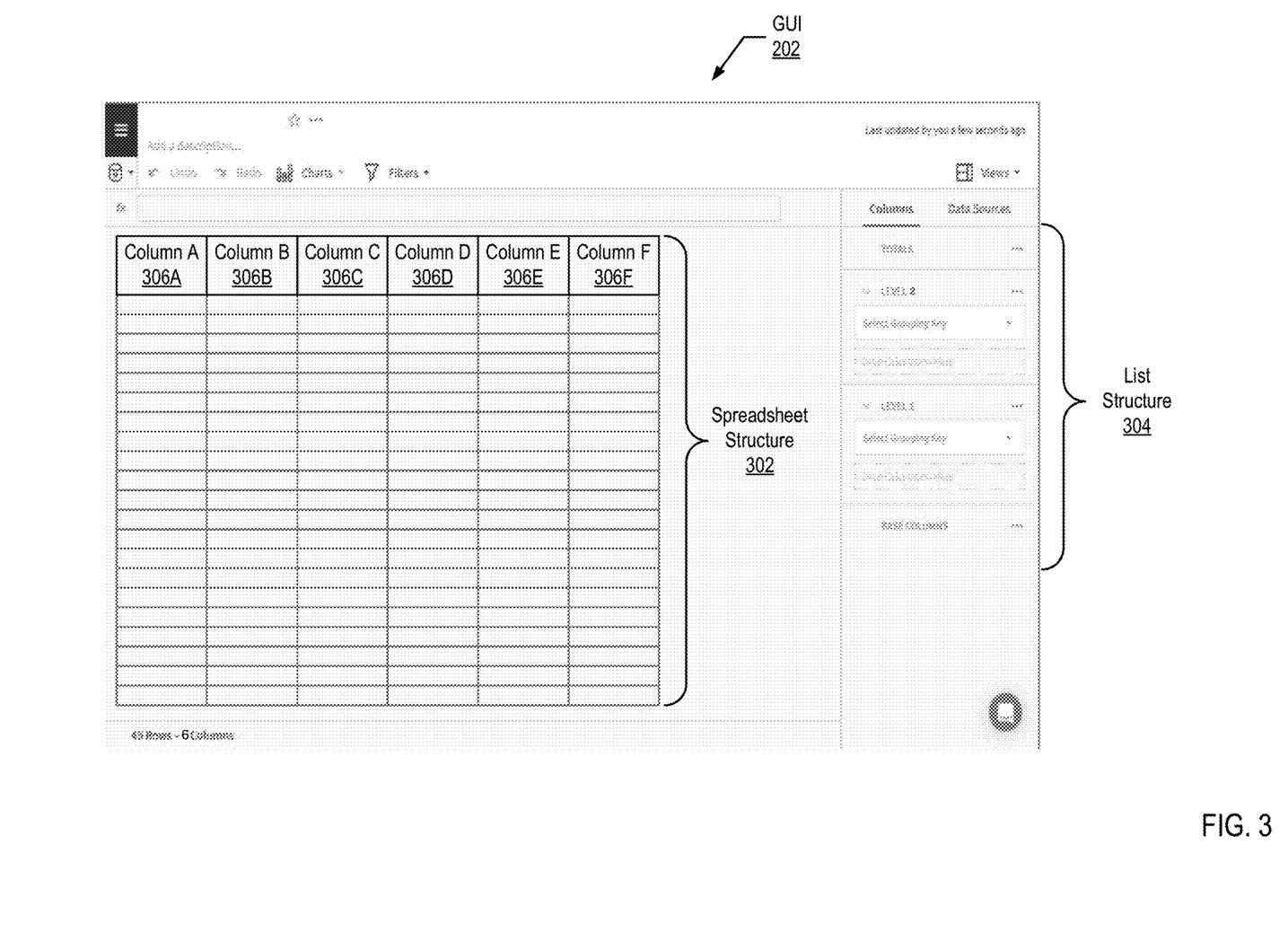
FIG. 3 sets forth a block diagram of an example system configured for directly accessing and organizing data sets from a data warehouse according to embodiments of the present invention.

FIG. 3 shows an exemplary system for directly accessing and organizing data sets from a data warehouse according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a table. A worksheet is a presentation of a table from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request a table from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for a table and send the request to the data analyzer (126). Such a mechanism may also include a direct identification of the rows and columns of a database table that a user would like to access (e.g., via a selection of the rows and columns in a dialog box).

The data sets may be organized into worksheets using worksheet templates. A worksheet template is a configuration of worksheet elements organized for a specific service provider or specific data set for a specific service provider. The configuration of worksheet elements may include an arrangement of the data set, the functions to be applied to the data set, and the presentation structure of the data set. The arrangement of the data set describes the order of the columns and rows in the worksheet. The functions to be applied to the data set may include the manipulations of the data in the columns and rows received in the data set. Such manipulations may include calculation columns that apply a function to data in the data set. The presentation structure of the data set may include the hierarchical relationship between the columns, filters applied to the data, and the manner in which the data is sorted. The presentation structure of the data set may also include the GUI visibility of particular data within the data set, such as filter settings or visibility status (e.g., hidden or not hidden) of a column within the data set. The presentation structure of the data set may also include the formatting of the worksheet, such as the size of rows and columns. Worksheet templates may be stored in a worksheet template repository on the data analyzer computing system.

Figure 4:
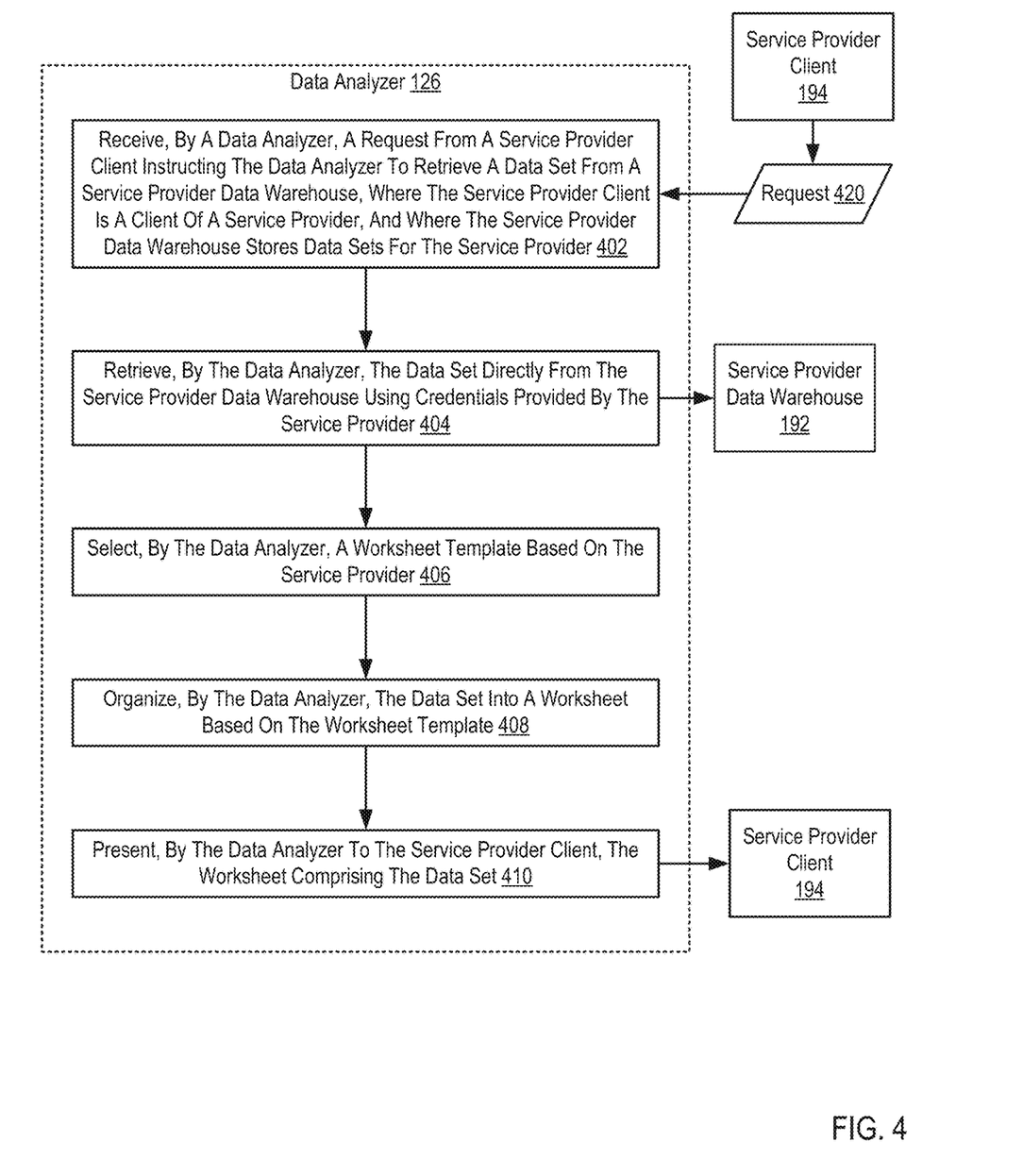
FIG. 4 sets forth a flow chart illustrating an exemplary method for directly accessing and organizing data sets from a data warehouse according to embodiments of the present invention.

For further explanation, FIG. 4 sets forth a flow chart illustrating an exemplary method for directly accessing and organizing data sets from a data warehouse according to embodiments of the present invention that includes receiving (402), by a data analyzer (126), a request (420) from a service provider client (194) instructing the data analyzer (126) to retrieve a data set from a service provider data warehouse (192), wherein the service provider client (194) is a client of a service provider, and wherein the service provider data warehouse (192) stores data sets for the service provider. Receiving (402), by a data analyzer (126), a request (420) from a service provider client (194) instructing the data analyzer (126) to retrieve a data set from a service provider data warehouse (192), wherein the service provider client (194) is a client of a service provider, and wherein the service provider data warehouse (192) stores data sets for the service provider may be carried out by the data analyzer (126) receiving the request (420) from the service provider client (194) via a GUI on the service provider client (194) identifying a data set from the service provider data warehouse (192) to retrieve and present on the GUI. The request (420) may further include identifying information about the service provider, such as a name and internet address of the service provider.

The service provider client (194) may access the data analyzer (126) and the service provider data warehouse (192) without providing credentials to the data analyzer (126) or the service provider data warehouse (192). The request (420) may be redirected from the service provider and include authorization information (such as a token) from the service provider that authorizes the service provider client (194) to access the service provider data warehouse (192). The data analyzer may use the authorization information to access the database via the secure data sharing interface (204). Alternatively, the data analyzer (126) may retrieve credentials for the service provider data warehouse (192) from the service provider.

The method of FIG. 4 further includes retrieving (404), by the data analyzer (126), the data set directly from the service provider data warehouse (192) using credentials provided by the service provider. Retrieving (404), by the data analyzer (126), the data set directly from the service provider data warehouse (192) using credentials provided by the service provider may be carried out by the data analyzer (126) submitting credentials provided by the service provider through a secure data sharing interface. The credentials may be secure data sharing interface credentials. Specifically, the credentials may be utilized only for accessing the database via the secure data sharing interface and may not be used to access the database on the service provider data warehouse in any other manner.

Retrieving (404), by the data analyzer (126), the data set directly from the service provider data warehouse (192) bypasses the service provider. For example, retrieving (404) the data set directly from the service provider data warehouse (192) may be performed without utilizing an API targeting the service provider, such as a REST API.

Using credentials provided by the service provider may be carried out by the data analyzer (126) obtaining the credentials from the service provider. Alternatively, the data analyzer (126) may obtain the credentials from the service provider client (194). The service provider client (194) may retrieve the credentials from the service provider or the service provider data warehouse (192) and then provide the retrieved credentials to the data analyzer (126).

The method of FIG. 4 further includes selecting (406), by the data analyzer (126), a worksheet template based on the service provider. Selecting (406), by the data analyzer (126), a worksheet template based on the service provider may be carried out by the data analyzer (126) searching for a worksheet template in a worksheet template repository that is configured for the service provider of the service provider client (194). The worksheet template repository may include worksheet templates configured to organize a data set from specific service providers. For example, a worksheet template repository may include a worksheet template for data sets from service provider A, a worksheet template for data sets from service provider B, and a worksheet template for data sets from service provider C. The data analyzer (126) may select a worksheet template based on a number of factors, including, for example, type of data set from the service provider, type of service provided by the service provider, size of the data set, and type of data contained in the data set (e.g., text, numbers, dates, etc.).

The worksheet template may be provided by the service provider. Specifically, the service provider may generate the worksheet template or instructions for generating the worksheet template and provide the template or instructions to the data analyzer (126). The data analyzer (126) may then generate the worksheet template from the instructions and store the worksheet template in the worksheet template repository indexed by the service provider and/or the data set type. Retrieving the worksheet template from the service provider may be performed dynamically after a service provider client (194) has requested a data set from the data analyzer (126).

The method of FIG. 4 further includes organizing (408), by the data analyzer (126), the data set into a worksheet based on the worksheet template. Organizing (408), by the data analyzer (126), the data set into a worksheet based on the worksheet template may be carried out by the data analyzer (126) applying the configuration of worksheet elements (including the arrangement of the data set, the functions to be applied to the data set, and the presentation structure of the data set) in the worksheet template to the data set retrieved from the service provider data warehouse (192).

The method of FIG. 4 further includes presenting (410), by the data analyzer (126) to the service provider client (194), the worksheet comprising the data set. Presenting (410), by the data analyzer (126) to the service provider client (194), the worksheet comprising the data set may be carried out by the data analyzer (126) displaying, in the GUI on the service provider client (194), the resultant worksheet from the data set having been organized into the worksheet template.

As an example of the above, assume that a food truck business uses a payment processing SaaS provider. The payment processor may generate data for each payment processed by the food truck and store that data in the database on the payment processor's data warehouse. Assume the food truck business operator wants to incorporate geographic location of sales to the payment processing data, and that this feature is not supported by the payment processor. Assume also that the payment processor has an account page with an embedded GUI for the data analyzer.

Continuing with the example, the food truck operator may request, via the GUI, all payments processed in the last 30 days with columns for date, time, order total, items ordered, and payment type. The data analyzer may then obtain credentials from the payment processor and use the credentials to access the payment processor's data warehouse. The credentials provided by the payment processor may only be authorized to access data created for the food truck operator. Once the requested data set is retrieved from the data warehouse, the data analyzer selects a worksheet template for the data set. The data analyzer may then search the worksheet template repository for a worksheet template specific to the payment processor and select that worksheet template.

Once the worksheet template is retrieved, the data analyzer organizes the data set into a worksheet based on the worksheet template. This may include arranging the columns by date, time, item ordered payment type, then order total. The worksheet template may also dictate a hierarchical relationship between the columns with the date column being at the highest order. Finally, the data analyzer presents the worksheet to the food truck operator.

The above steps may also be used to combine data sets from two or more different service providers. For example, the food truck operator in the above example may use the same steps to access a data set from a different service provider (e.g., a customer relationship management SaaS provider), and join that data set to the payment processor's data set in a worksheet from the data analyzer.

The above limitations improve the operation of the computer system by creating a platform for service provider clients to view data sets in an organized manner tailored to the source service provider while also bypassing the source service provider. This is accomplished by accessing the data warehouse directly (e.g., using a secure data sharing interface) and organizing the retrieved data sets into worksheets using worksheet templates specific to the service provider.

Figure 5:
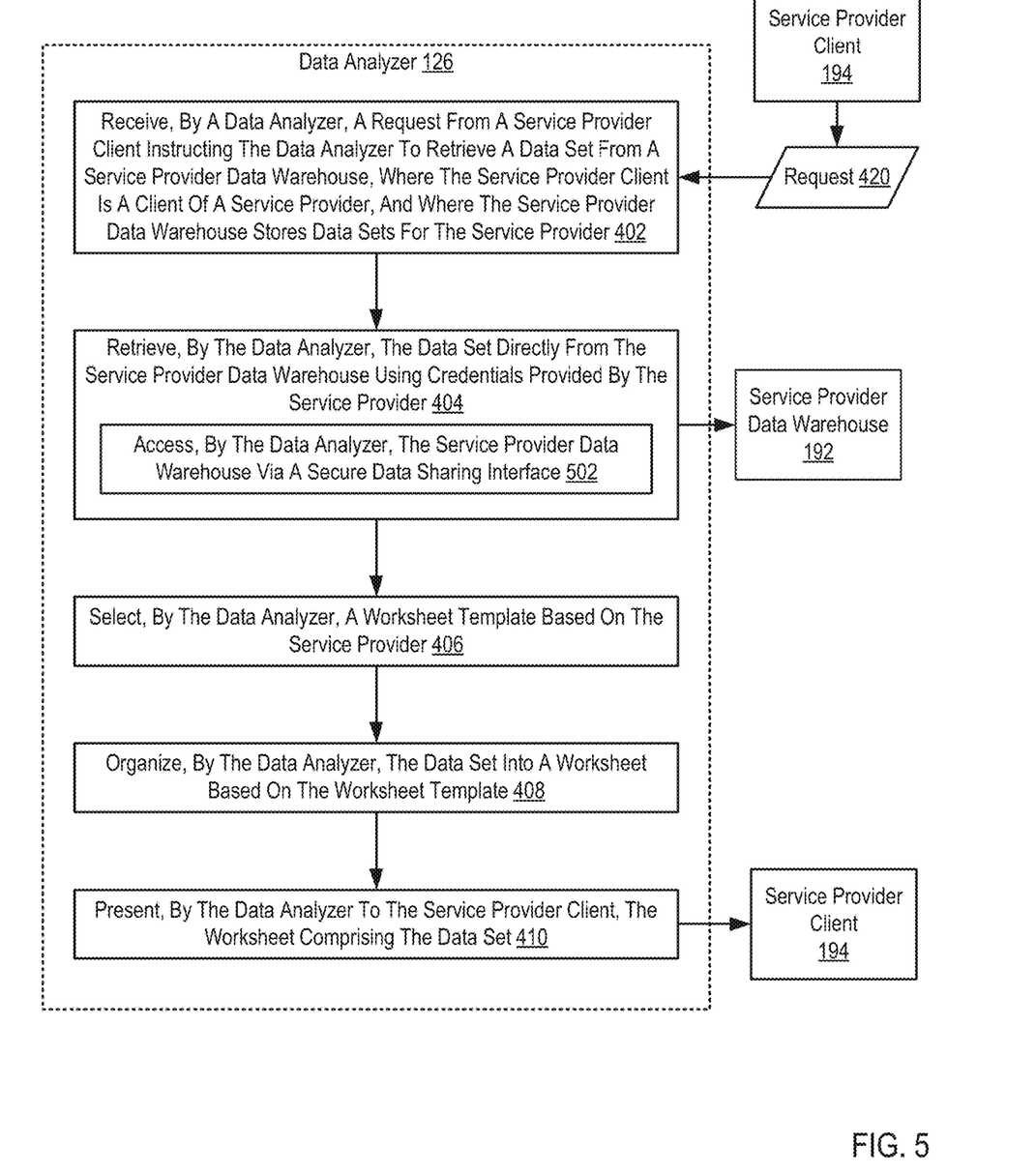
FIG. 5 sets forth a flow chart illustrating an exemplary method for directly accessing and organizing data sets from a data warehouse according to embodiments of the present invention.

For further explanation, FIG. 5 sets forth a flow chart illustrating a further exemplary method for directly accessing and organizing data sets from a data warehouse according to embodiments of the present invention that includes receiving (402), by a data analyzer (126), a request (420) from a service provider client (194) instructing the data analyzer (126) to retrieve a data set from a service provider data warehouse (192), wherein the service provider client (194) is a client of a service provider, and wherein the service provider data warehouse (192) stores data sets for the service provider; retrieving (404), by the data analyzer (126), the data set directly from the service provider data warehouse (192) using credentials provided by the service provider; selecting (406), by the data analyzer (126), a worksheet template based on the service provider; organizing (408), by the data analyzer (126), the data set into a worksheet based on the worksheet template; and presenting (410), by the data analyzer (126) to the service provider client (194), the worksheet comprising the data set.

The method of FIG. 5 differs from the method of FIG. 4, however, in that retrieving (404), by the data analyzer (126), the data set directly from the service provider data warehouse (192) using credentials provided by the service provider includes accessing (502), by the data analyzer (126), the service provider data warehouse (192) via a secure data sharing interface. Accessing (502), by the data analyzer (126), the service provider data warehouse (192) via a secure data sharing interface may be carried out by the data analyzer (126) using the credentials from the service provider to log in to the service provider data warehouse, bypassing the service provider entirely. The secure data sharing interface may allow the data analyzer (126) to access data sets that the service provider client (194) is authorized by the service provider to access.

Figure 6:
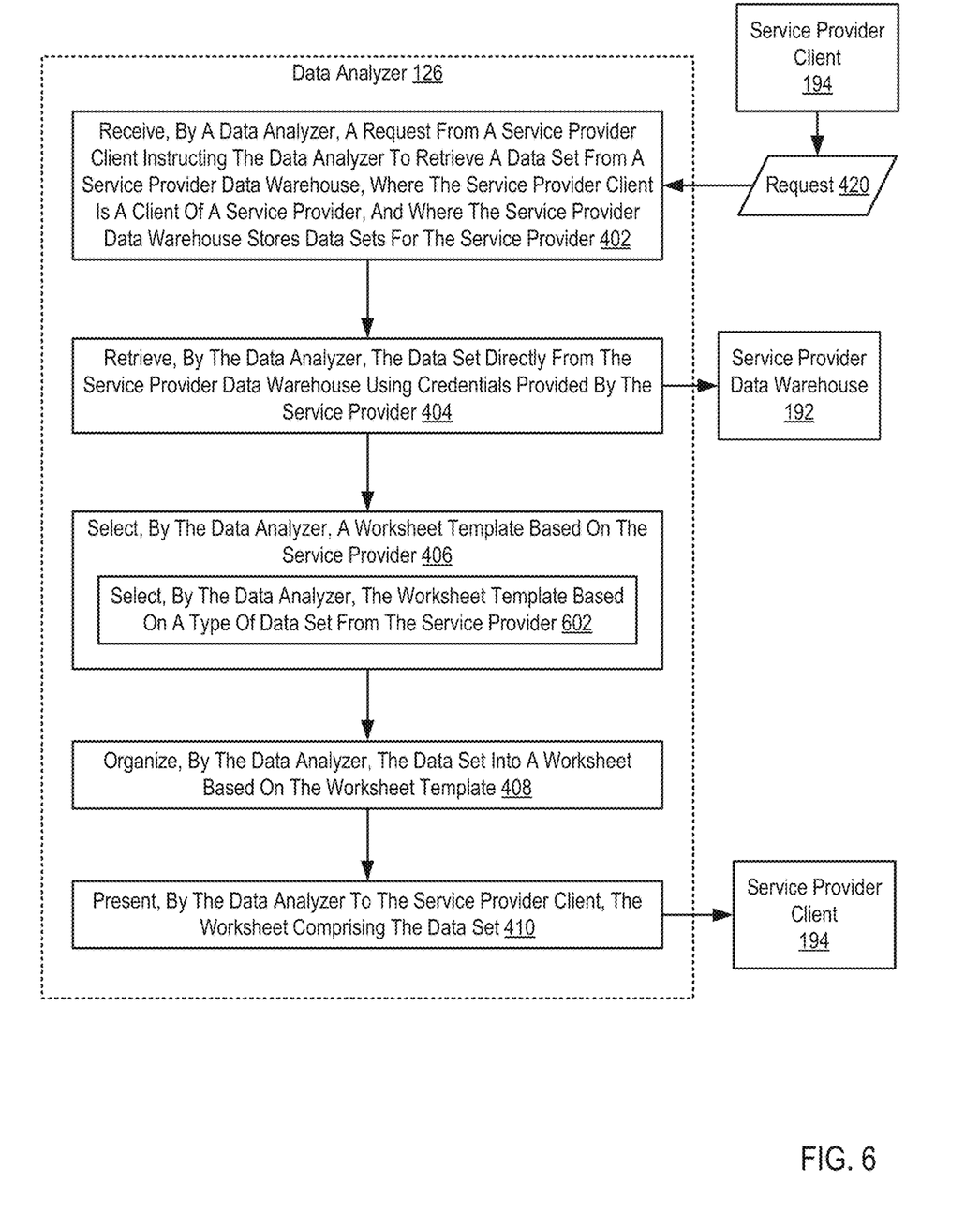
FIG. 6 sets forth a flow chart illustrating an exemplary method for directly accessing and organizing data sets from a data warehouse according to embodiments of the present invention.

For further explanation, FIG. 6 sets forth a flow chart illustrating a further exemplary method for directly accessing and organizing data sets from a data warehouse according to embodiments of the present invention that includes receiving (402), by a data analyzer (126), a request (420) from a service provider client (194) instructing the data analyzer (126) to retrieve a data set from a service provider data warehouse (192), wherein the service provider client (194) is a client of a service provider, and wherein the service provider data warehouse (192) stores data sets for the service provider; retrieving (404), by the data analyzer (126), the data set directly from the service provider data warehouse (192) using credentials provided by the service provider; selecting (406), by the data analyzer (126), a worksheet template based on the service provider; organizing (408), by the data analyzer (126), the data set into a worksheet based on the worksheet template; and presenting (410), by the data analyzer (126) to the service provider client (194), the worksheet comprising the data set.

The method of FIG. 6 differs from the method of FIG. 4, however, in that selecting (406), by the data analyzer (126), a worksheet template based on the service provider includes selecting (602), by the data analyzer (126), the worksheet template based on a type of data set from the service provider. Selecting (602), by the data analyzer (126), the worksheet template based on a type of data set from the service provider may be carried out by the data analyzer (126) determining a type for the retrieved data set and matching the data set type and service provider to a worksheet template in the worksheet template repository. Examples of data type may include financial transaction data sets, business contact data sets, geographic data sets, changes over time data sets, etc.

Figure 7:
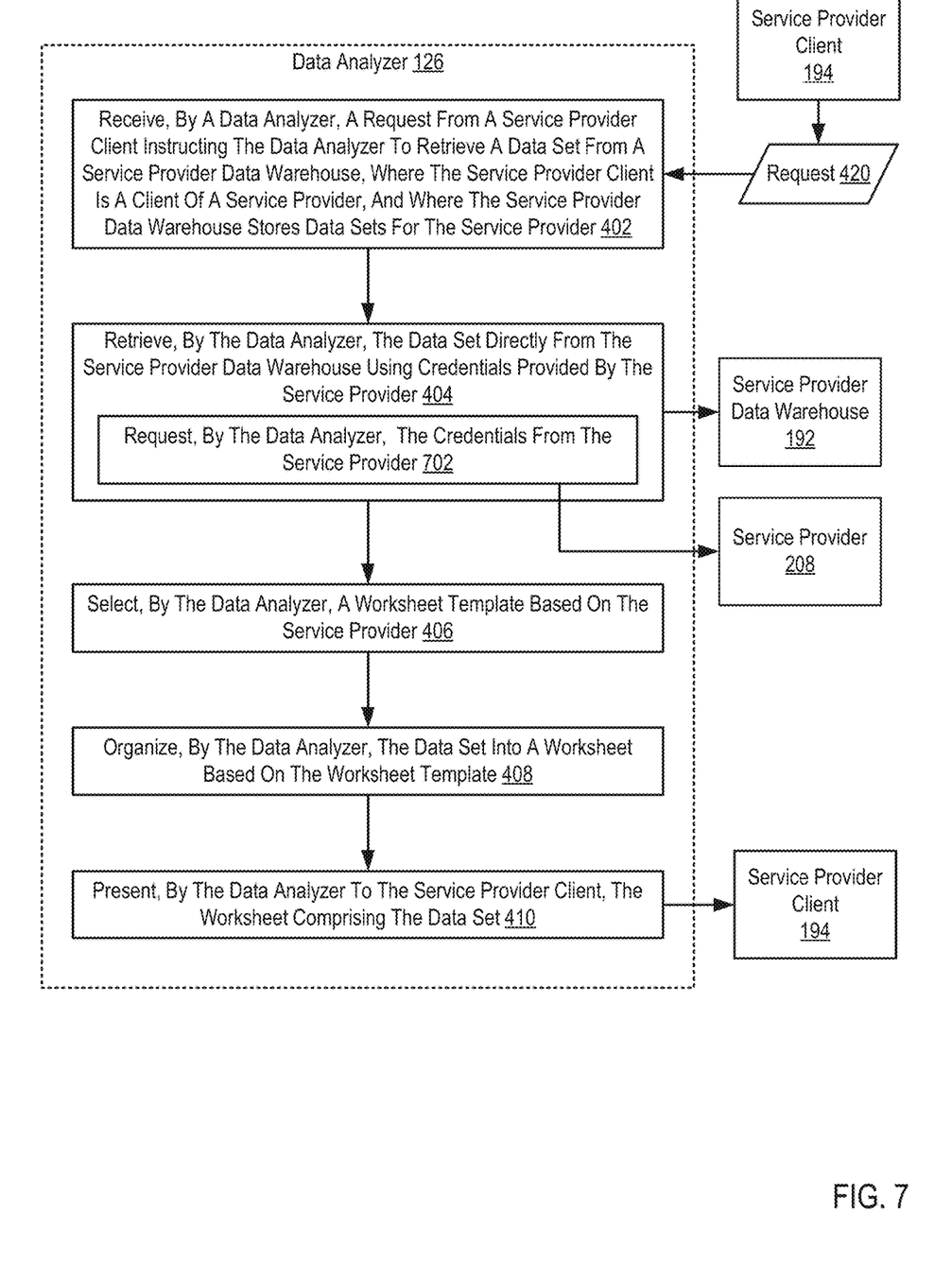
FIG. 7 sets forth a flow chart illustrating an exemplary method for directly accessing and organizing data sets from a data warehouse according to embodiments of the present invention.

For further explanation, FIG. 7 sets forth a flow chart illustrating a further exemplary method for directly accessing and organizing data sets from a data warehouse according to embodiments of the present invention that includes receiving (402), by a data analyzer (126), a request (420) from a service provider client (194) instructing the data analyzer (126) to retrieve a data set from a service provider data warehouse (192), wherein the service provider client (194) is a client of a service provider, and wherein the service provider data warehouse (192) stores data sets for the service provider; retrieving (404), by the data analyzer (126), the data set directly from the service provider data warehouse (192) using credentials provided by the service provider; selecting (406), by the data analyzer (126), a worksheet template based on the service provider; organizing (408), by the data analyzer (126), the data set into a worksheet based on the worksheet template; and presenting (410), by the data analyzer (126) to the service provider client (194), the worksheet comprising the data set.

The method of FIG. 7 differs from the method of FIG. 4, however, in that retrieving (404), by the data analyzer (126), the data set directly from the service provider data warehouse (192) using credentials provided by the service provider includes requesting (702), by the data analyzer (126), the credentials from the service provider (208). Requesting (702), by the data analyzer (126), the credentials from the service provider (208) may be carried out by the data analyzer (126) generating a request for secure data sharing interface credentials from the service provider (208) that includes an identifier of the service provider client (194). The request may then be sent to the service provider (208) directly or via the service provider client (194) thereby making use of the service provider client (194) authorization with the service provider (208).

In view of the explanations set forth above, readers will recognize that the benefits of directly accessing and organizing data sets from a data warehouse according to embodiments of the present invention include:

Improving the operation of a computing system by creating a platform for service provider clients to view data sets in an organized manner tailored to the source service provider, increasing computing system efficiency and usability.

Improving the operation of a computing system by creating a platform for service provider clients to view data sets while bypassing the source service provider, increasing computing system efficiency and usability.

Exemplary embodiments of the present invention are described largely in the context of a fully functional computer system for directly accessing and organizing data sets from a data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    retrieving, by a data analyzer in response to a request from a service provider client and without the service provider client providing credentials to the data analyzer, a data set from a service provider data warehouse using credentials provided by a service provider, wherein the service provider client is a client of a service provider, and wherein the service provider data warehouse stores data sets for the service provider;
    organizing, by the data analyzer, the data set into a worksheet; and
    presenting, by the data analyzer to the service provider client, the worksheet comprising the data set.

2. The method of claim 1, wherein retrieving, by the data analyzer, the data set directly from the service provider data warehouse using credentials provided by the service provider comprises accessing, by the data analyzer, the service provider data warehouse via a secure data sharing interface.

3. The method of claim 1, wherein retrieving, by the data analyzer, the data set directly from the service provider data warehouse bypasses the service provider.

4. The method of claim 1, wherein the service provider client is granted access to the data analyzer and the service provider data warehouse using authorization information.

5. The method of claim 1, wherein organizing, by the data analyzer, the data set into a worksheet comprises selecting, by the data analyzer, the worksheet based on a type of data set.

6. The method of claim 1, wherein retrieving, by the data analyzer, the data set directly from the service provider data warehouse using credentials provided by the service provider comprises requesting the credentials from the service provider.

7. The method of claim 1, wherein the request comprises identifying information about the service provider.

8. An apparatus for comprising a computer processor, a computer memory operatively coupled to the computer processor, the computer memory having disposed within it computer program instructions that, when executed by the computer processor, cause the apparatus to carry out the steps of:
    retrieving, by a data analyzer in response to a request from a service provider client and without the service provider client providing credentials to the data analyzer, a data set from a service provider data warehouse using credentials provided by a service provider, wherein the service provider client is a client of a service provider, and wherein the service provider data warehouse stores data sets for the service provider;
    organizing, by the data analyzer, the data set into a worksheet; and
    presenting, by the data analyzer to the service provider client, the worksheet comprising the data set.

9. The apparatus of claim 8, wherein retrieving, by the data analyzer, the data set directly from the service provider data warehouse using credentials provided by the service provider comprises accessing, by the data analyzer, the service provider data warehouse via a secure data sharing interface.

10. The apparatus of claim 8, wherein retrieving, by the data analyzer, the data set directly from the service provider data warehouse bypasses the service provider.

11. The apparatus of claim 8, wherein the service provider client is granted access to the data analyzer and the service provider data warehouse using authorization information.

12. The apparatus of claim 8, wherein organizing, by the data analyzer, the data set into a worksheet comprises selecting, by the data analyzer, the worksheet based on a type of data set.

13. The apparatus of claim 8, wherein retrieving, by the data analyzer, the data set directly from the service provider data warehouse using credentials provided by the service provider comprises requesting the credentials from the service provider.

14. The apparatus of claim 8, wherein the request comprises identifying information about the service provider.

15. A computer program product comprising a computer readable medium, the computer program product comprising computer program instructions that, when executed, cause a computer to carry out the steps of:
    retrieving, by a data analyzer in response to a request from a service provider client and without the service provider client providing credentials to the data analyzer, a data set from a service provider data warehouse using credentials provided by a service provider, wherein the service provider client is a client of a service provider, and wherein the service provider data warehouse stores data sets for the service provider;
    organizing, by the data analyzer, the data set into a worksheet; and
    presenting, by the data analyzer to the service provider client, the worksheet comprising the data set.

16. The computer program product of claim 15, wherein retrieving, by the data analyzer, the data set directly from the service provider data warehouse using credentials provided by the service provider comprises accessing, by the data analyzer, the service provider data warehouse via a secure data sharing interface.

17. The computer program product of claim 15, wherein retrieving, by the data analyzer, the data set directly from the service provider data warehouse bypasses the service provider.

18. The computer program product of claim 15, wherein the service provider client is granted access to the data analyzer and the service provider data warehouse using authorization information.

19. The computer program product of claim 15, wherein organizing, by the data analyzer, the data set into a worksheet comprises selecting, by the data analyzer, the worksheet based on a type of data set.

20. The computer program product of claim 15, wherein retrieving, by the data analyzer, the data set directly from the service provider data warehouse using credentials provided by the service provider comprises requesting the credentials from the service provider.

* * * * *